Nov. 22, 1966 R. F. OSTRANDER 3,286,517
VEHICLE WHEEL AND ENGINE TESTING APPARATUS
Filed Sept. 24, 1963 4 Sheets-Sheet 1

INVENTOR.
ROBERT F. OSTRANDER
BY John K. Conant
ATTORNEY

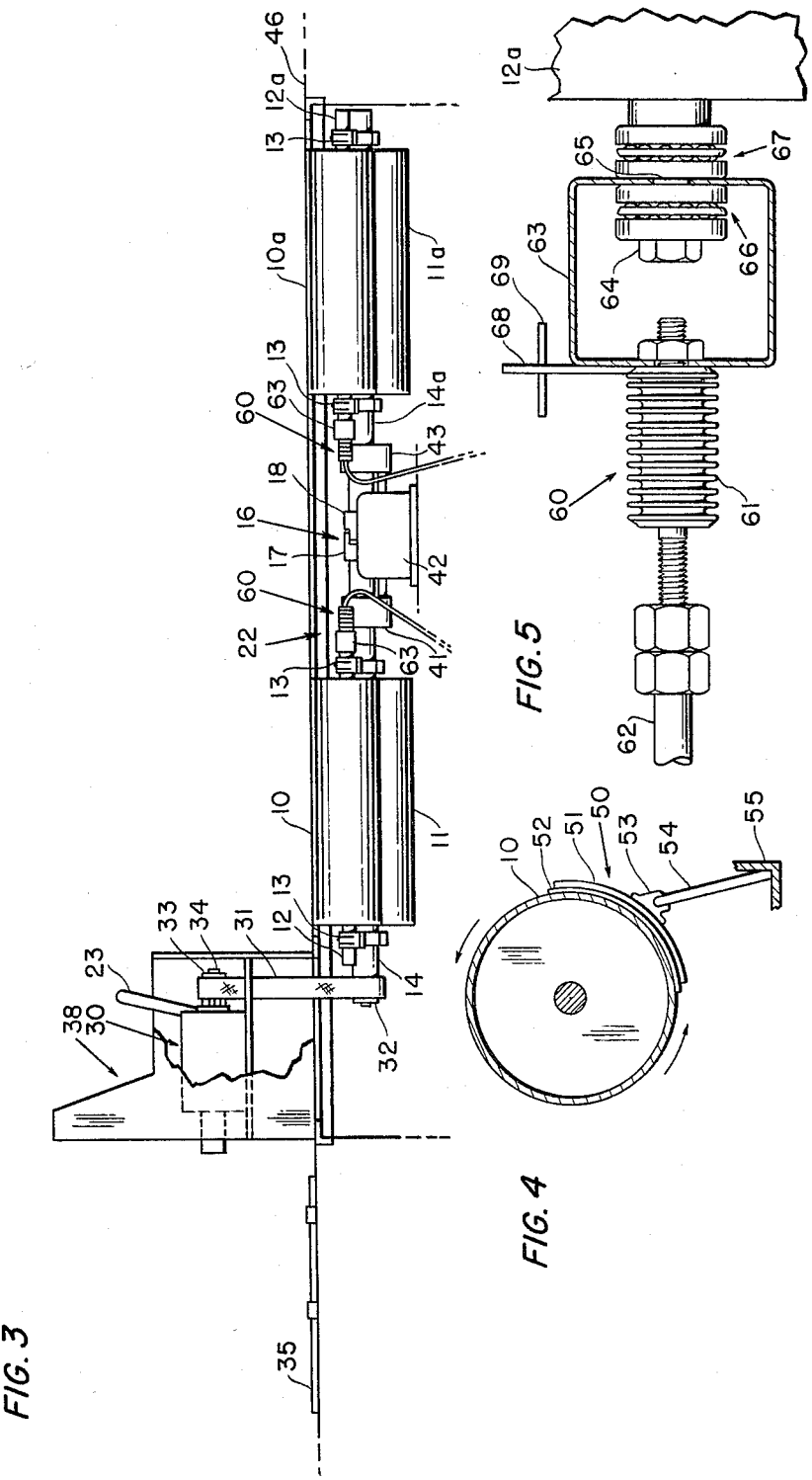

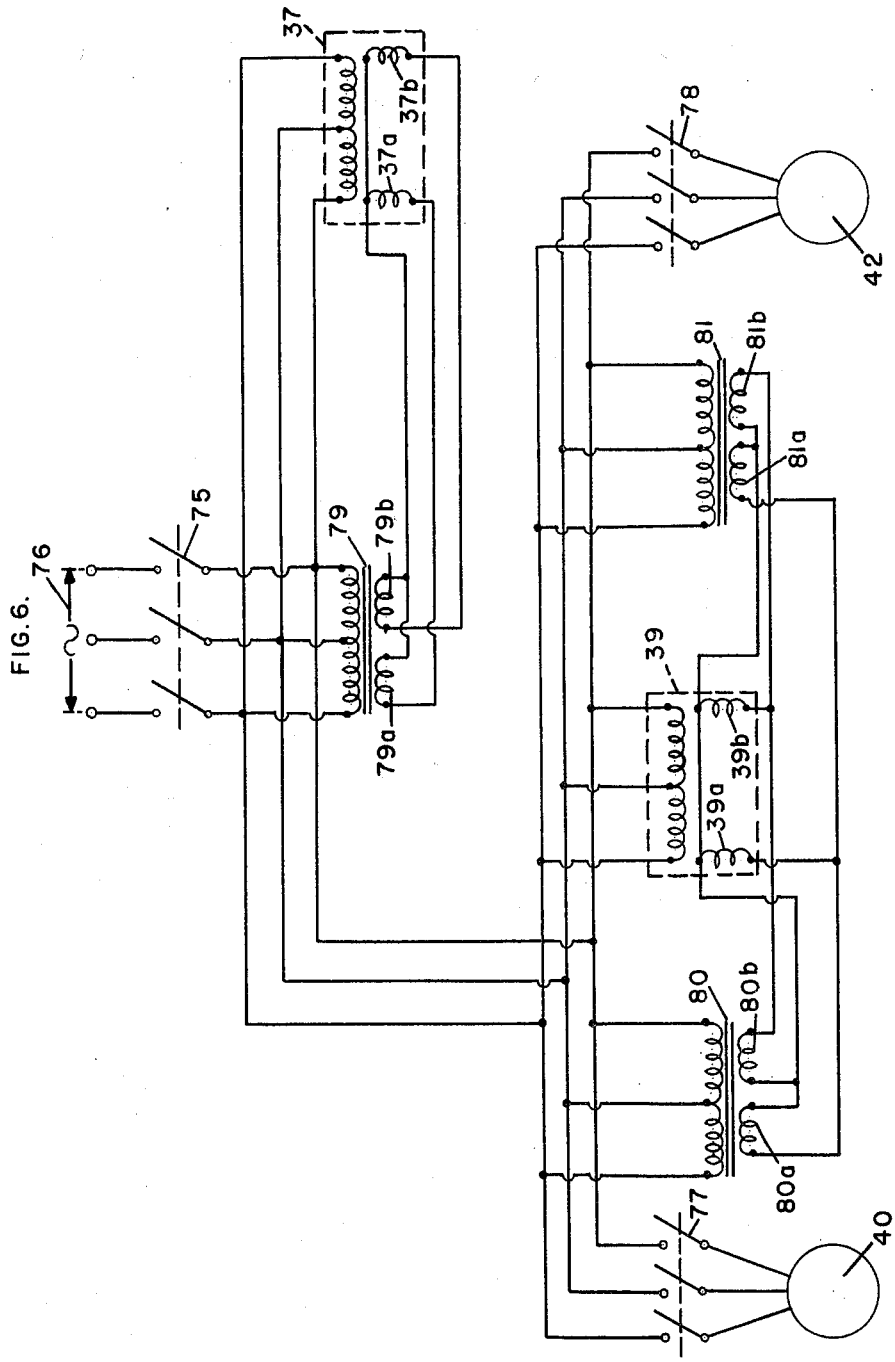

United States Patent Office 3,286,517
Patented Nov. 22, 1966

3,286,517
VEHICLE WHEEL AND ENGINE
TESTING APPARATUS
Robert F. Ostrander, New Haven, Conn., assignor to
Ostradyne, Inc., New Haven, Conn., a corporation of
Connecticut
Filed Sept. 24, 1963, Ser. No. 311,144
7 Claims. (Cl. 73—116)

The present application is a continuation-in-part of my previous application Serial No. 30,381, filed May 19, 1960, now abandoned.

This invention relates to dynamometers of the type used to test such performance factors as the horsepower output, braking power, and wheel alignment of automobiles, trucks, and other vehicles.

The principal object of this invention is to provide a testing device by means of which various factors affecting the performance and condition of a vehicle, such as power output at the drive wheels, effectiveness of the braking system, and wheel alignment of the drive and steering wheel, may be tested quickly and accurately under conditions closely simulating actual road conditions. Another object is to provide means for measuring both the total horsepower output or braking effect of a pair of vehicle wheels, and the distribution of these forces between the wheels. Another object is to provide means for testing vehicles equipped with non-slip differentials.

The apparatus, according to the present invention, includes two pairs of rolls mounted side by side in such arrangement that each pair may support one of a pair of wheels of a vehicle in rolling engagement. One of each pair of rolls may be driven or braked to drive or brake the vehicle wheel in contact with the pair. For this purpose, a pair of motor generators are connected, one to each of the driven rolls. The motor generators are connected to wattmeters which indicate their combined and differential power consumption when they are used for driving and power output when they are used for braking. A dynamometer, which may be of the fluid absorption type is connected to the rolls, and may be set to absorb the power output, when the rolls are being driven by the vehicle wheels, and the motor generators may be used simultaneously to indicate variations in the power output of the vehicle. The shafts of the driven rolls are connected together through a clutch, so that the rolls may be driven either separately or in unison. The idler roll of each pair is axially movable and is provided with means for measuring sideward force or "scuff" produced by the wheels of the vehicle when they are out of alignment, or to measure turning radius.

Other objects, advantages and novel features of the invention will be apparent from the following description.

In the drawings illustrating the invention:

FIG. 3 is a side elevation looking at the right side of the apparatus shown in FIGURE 2;

FIG. 4 is a side elevation partly in section of one of the laterally movable rolls and showing a brake device for preventing rotation of the roll in one direction;

FIG. 5 is an enlarged top plan view of one of the four similar devices, one of which is attached at each end of the laterally movable rolls to position the rolls and measure lateral pressure applied to the rolls by wheels being tested for alignment and turning radius; and FIG. 6 is a schematic wiring diagram of the electrical measuring system.

Figure 2:
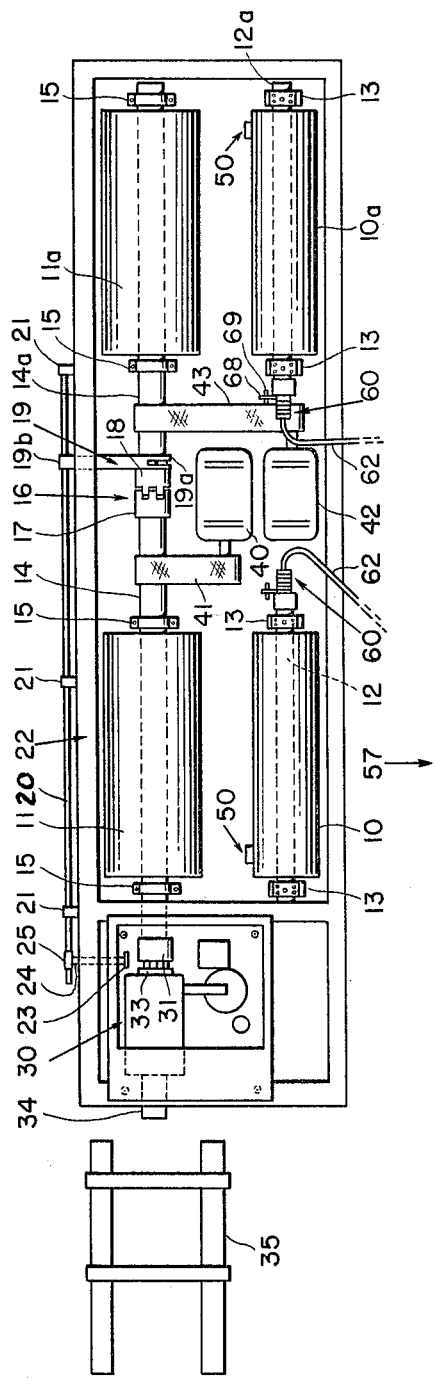
FIG. 2 is a top plan view partly in dash line and showing the apparatus with cover plates removed.

Referring now to the drawings and first to FIGURE 2, the apparatus of the present invention includes two pairs of parallel rolls 10 and 11 and 10a and 11a. The rolls 10 and 10a are fixed on shafts 12 and 12a and are supported so as to be movable through the bearings 13. The rolls 10 and 10a are therefore movable laterally along their axes. The extent of this lateral movement is, of course, limited by the positions of the bearings 13 and for the operation of the apparatus of the present invention it is only necessary that shafts 12 and 12a be able to move about a half an inch.

The rolls 11 and 11a are fixed on shafts 14 and 14a which are rotatably supported in bearings 15. The shafts 14 and 14a are connectable by a clutch 16 having jaws 17 and 18. The jaw 17 is fixed on the shaft 14. The jaw 18 is keyed on and slidable on shaft 14a. The clutch 16 is engaged and disengaged by an arm 19 having a forked end 19a engaging a lug on jaw 18. The other end 19b of the arm 19 is attached to a rod 20 which is slidably supported in three brackets 21 on the frame 22 of the apparatus. The rod 20 is moved back and forth to engage and disengage the clutch by lever mechanism consisting of a handle 23 extending upward from one end of a pivot rod 24 which is supported in the frame 22 and which has a depending arm 25 attached to its other end. The lower end of the arm 25 extends down into a slot (not shown) in the rod 20 so that movement of the handle 23 causes the arm 25 to bear against one end of the slot or the other to slide the rod 22 and engage or disengage the jaws 17 and 18 of the clutch 16.

Looking now at FIGS. 2 and 3, the shaft 14 is connected to a dynamometer 30 of any conventional type such as an absorption water brake, by a belt 31 around a pulley 32 on shaft 14 and a pulley 33 on a shaft 34 of the dynamometer. In the preferred embodiment of the present invention the shaft 34 extends out beyond two opposite sides of the dynamometer. At one end the shaft 34 is connected to shaft 14 as described above. The other end may be connected through a suitable flexible coupling to the drive shaft of an engine, supported on an engine test mount 35 as illustrated at 36 in FIG. 1 in order to test the horsepower of the engine. The horsepower of an engine 36 being tested would be read on dial 49. Horsepower measured by the dynamometer through the rolls 11 and 11a as will be described is also read on dial 49.

An engine on the test mount 35 would not be tested at the same time the remainder of the apparatus was in operation and this latter feature is mentioned primarily to illustrate the versatility of the preferred embodiment of the apparatus of the present invention.

The roll 11 and its shaft 14 are also connected to an electric motor generator 40 by a belt 41 around suitable pulleys on the shaft 14 and the drive shaft of the motor generator 40. The roll 11 may thus be driven by the motor generator 40 when desired as will be described in more detail below.

Similarly and for the same purpose, the roll 11a and its shaft 14a are connected to a second electric motor generator 42 by a belt 43 around pulleys on the shaft 14a and on the drive shaft of the motor 42.

The rolls 11 and 11a may each be driven independently by the respective motor generators 40 and 42 when the clutch 16 is disengaged. Or when the clutch 16 is engaged to connect the shafts 14 and 14a the two rolls 11 and 11a may be driven by one or both motor generators. The wattage required to drive the motor generators 40 and 42 registers on a dial 37 of a watt hour meter. The dial 37 also registers the wattage generated when the motor generators are driven as generators. A second dial 39 shows the differential of the wattage used or generated by the two motor generators.

Figure 1:
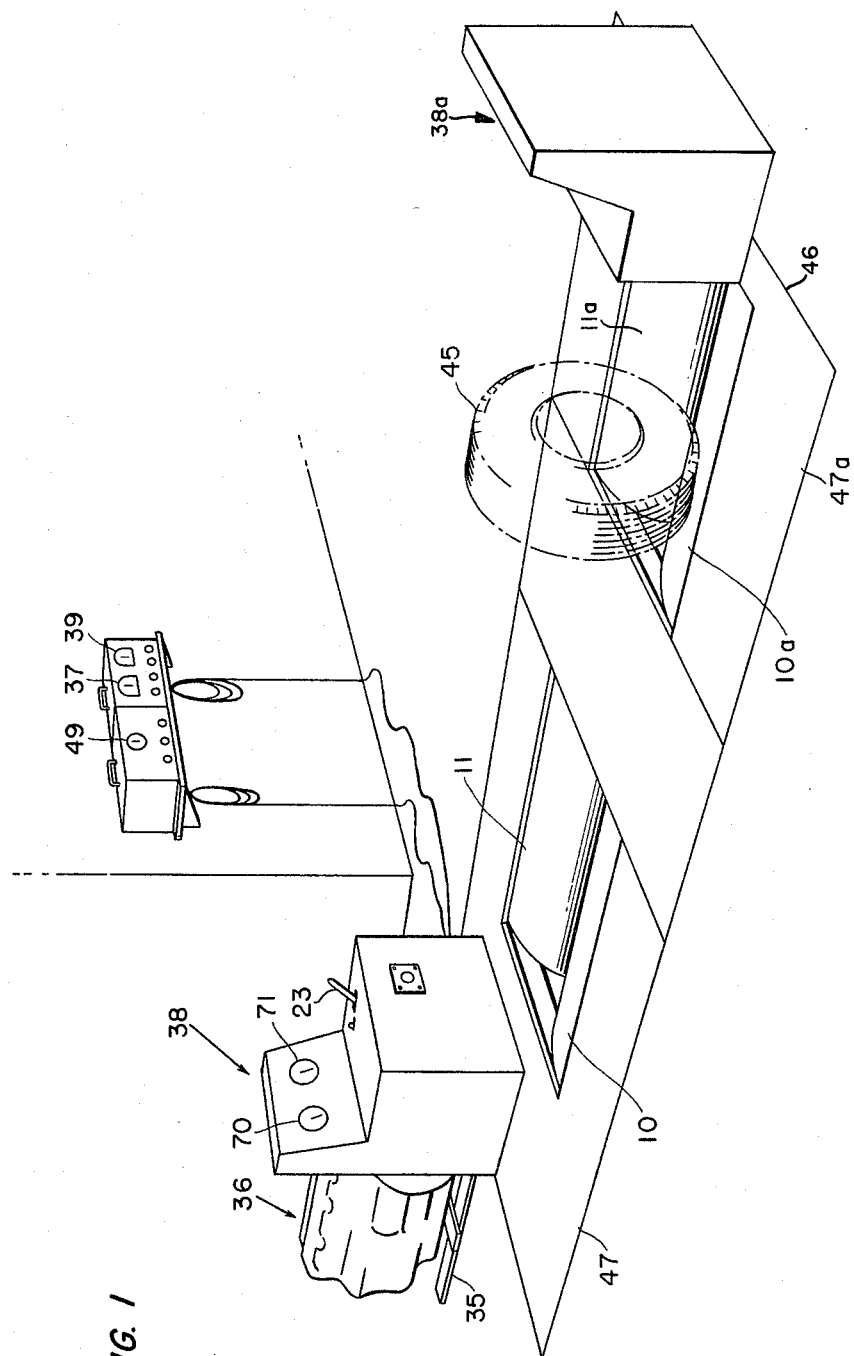
FIG. 1 is a perspective view of the apparatus showing it mounted with the rolls in a pit so that their top portions are at floor level and showing a wheel in dash lines supported in testing position on one pair of rolls.

Referring now to FIGS. 1 and 2, the pair of rolls 10 and 11 and similarly the pair of rolls 10a and 11a are arranged with their axes parallel and rolls in each pair are spaced closely enough together to support a wheel such as the wheel 45 shown in dash lines in FIG. 1, with the axis of the wheel generally parallel to the axis of the pair of rolls on which it is supported.

The two pairs of rolls are arranged side by side and spaced apart so that each wheel of a pair of vehicle wheels, such as the pair of front wheels of an automobile or truck, may be supported on one of the pairs of rolls. The rolls are sufficiently long to accommodate the pairs of wheels of vehicles of various sizes—from the small automobile to large trucks.

As shown in FIGS. 1 and 3 in the preferred embodiment of the present invention the apparatus is arranged with the pairs of rolls 10 and 11 and 10a and 11a in a pit so that the tops of the rolls are approximately at the level of the surrounding ground or floor 46.

Cover plates 47 and 47a over the pairs of rolls are slotted so as to cover all but the surfaces of the rolls on which the wheels are supported. Thus a vehicle may be driven over the floor until its pair of wheels to be tested are between and resting on the rolls 10 and 11 and 10a and 11a.

It will be appreciated that when a pair of vehicle drive wheels are on the rolls it would be impossible to move the vehicle off the rolls by its own power if the rolls 10 and 11 and 10a and 11a were freely rotatable. The drive wheels would simply rotate the rolls. Removable one-way clutch type brakes 50, illustrated in FIG. 4, are therefore provided and may be placed in contact with any of the rolls to prevent rotation in one direction and thereby permit a drive wheel to get traction on the roll.

As shown in FIG. 4 the brake 50 consists of member 51 curved to match approximately the curvature of the roll on which it operates, designated roll 10 for illustrative purposes in FIG. 4. The concave surface of member 51 is lined with a conventional brake lining 52 which comes in contact with the roll 10. At 53 the member 51 is pivotally connected to support arm 54, the bottom end of which rests in the V of a channel member 55 which is attached to the frame of the apparatus. The channel member 55 is placed so that with the support arm 54 resting therein the lining 52 of the curved member 51 rests against the roll 10. The portion of the member 51 and lining 52 above the pivot at 53 is longer than the portion below so that the lower portion normally rests against the roll with slightly more weight than the upper. When the roll 10 is rotated in the direction of the arrows it tends to push the brake 50 up and away to the right in which direction it is free to move, so that the roll rotates freely. When the roll is turned in the opposite direction, however, the brake 50 is urged down and to the left and wedges against the roll to brake the rotation in that direction.

In FIG. 2 a brake 50 is indicated in position against the roll 10 and another against roll 10a. In this position the rolls would be braked so as to permit the drive wheels of a vehicle to be driven over the rolls in the direction of the arrow at 57.

Similar brakes 50 may be placed against rolls 11 and 11a at the sides toward rolls 10 and 10a to permit drive wheels to be driven over the rolls 11 and 11a in the opposite direction from arrow at 57.

As previously mentioned the rolls 10 and 10a are fixed on their shafts 12 and 12a which are movable laterally along their axes. At one end of each of the shafts 12 and 12a as seen in FIG. 2 is a pressure-measuring device 60 which measures lateral pressure applied to the rolls. The measuring devices 60 also urge the rolls 10 and 10a to a predetermined lateral position.

The pressure-measuring devices 60, one of which is shown in detail in FIG. 5, consists of bellows 61 attached at one end to a hose line 62 and at the other to a box member 63. The box member 63 is in turn connected by a cap screw 64 to the end of the shaft 12a. A similar box member 63 with attached elements is connected to the end of shaft 12. The cap screw 64 passes through a hole 65 in the box member 63 and is threaded into the end of shaft 12a. Thrust bearings 66 and 67 on the cap screw 64 at the inside and outside respectively of the box member 63 permit the cap screw 64 and shaft 12a to rotate independently of the box member which is prevented from rotation by an attached arm 68 which rests on and is slidable along the top of a support 69 extending upward from the frame of the apparatus. The box member 63 is movable laterally along with the shaft 12a and compresses or extends the attached bellows 61 according to the direction of lateral movement of the shaft.

Gauges having dials 70 and 71 (FIG. 1) are on the end of hose lines 62 of the pressure measuring devices associated with the respective rolls 10 and 10a and are calibrated to show the plus or minus variation from the normal pressure in the hose lines 62 and bellows 61. Thus, when the roll 10 or 10a is pushed laterally in a direction in which the bellows 61 is compressed the increase in the pressure in the hose line 62 registers on one of the dials 70 or 71, dial 70 being associated with roll 10 and dial 71 being associated with roll 10a. When the roll is pushed in the opposite direction the bellows is drawn out and the resulting decrease in pressure registers on the dial.

When there is no lateral pressure on the rolls 10 and 10a they are maintained in or returned to a predetermined lateral position by the normal pressure or the return to normal pressure in the hose.

In operation, to test a pair of vehicle wheels for alignment or steering geometry the vehicle is moved over the apparatus until the wheels are supported respectively on the pairs of rolls 10 and 11 and 10a and 11a. If the wheels are drive wheels, they may be rotated by the vehicle's engine. Otherwise they are rotated by using the motor generators 40 and 42 to rotate the rolls 11 and 11a. Each wheel may be tested separately for detecting other malfunctions by disengaging the clutch 16. The motor generator 40 would then of course be used in testing the wheel in contact with roll 11 and the motor generator 42 would be used for testing the wheel in contact with roll 11a. As previously mentioned, both rolls 11 and 11a may be driven with either or both motor generators when clutch 16 is engaged. If the true axis of rotation of a wheel rotating in contact with the roll 10 or 10a is not parallel to the axis of rotation of the roll, the wheel "scuffs" against the roll and thereby exerts lateral pressure on it. As described above, such lateral pressure or scuff exerted on rolls 10 or 10a is measured and the pressure registers on dial 70 or dial 71 respectively.

If one or both wheels of a pair supported on the rolls 10 and 11 and 10a and 11a toe in or out or tilt in or out in relation to a line between the centers of the wheels, it will be apparent that the true axis of rotation of the wheel or wheels will not be parallel to the axis of the roll 10 and/or 10a with which the wheel or wheels are in contact.

It is quite common for wheels to be mounted and adjusted with a certain degree of toe in or out and/or to be tilted in or out to some extent. In this case the apparatus of the present invention is used to determine whether or not the toe in or out and/or tilt is within the limits specified by the manufacturer and is equal for both wheels of a pair.

In testing the ratio of turning radius of a pair of steering wheels on the rolls 10 and 11 and 10a and 11a, the wheels, while being rotated, are turned slightly and lateral pressure exerted on the rolls 10 and 10a by the turn is measured. As previously mentioned pairs of steering wheels are normally mounted and adjusted so that the inside wheel on a turn turns a greater degree than the outside wheel which travels over a longer and flatter arc. Whether or not the ratio of turning radii of the steering wheel is correct is determined by comparing the lateral pressure exerted on the rolls 10 and 10a when the wheels are turned.

The horsepower effective at the wheels of a vehicle is determined by placing the vehicle with its drive wheels on the rolls and running the vehicle's engine. Either the dynamometer alone or the motor generators alone may be used to determine the horsepower. If the dynamometer is used alone, the amount of horsepower registers on a dial 49. The horsepower effective at the wheels on the rolls may be determined by taking a reading on the dial 49 with the clutch 16 engaged so that the dynamometer is connected to both pairs of rolls.

As mentioned above the horsepower effective at the wheels is also determinable from the motor generators. With the vehicle's engine and wheels driving the rolls the motor generators are also driven and act as generators. Horsepower is computed from the amount of wattage produced which is read on dial 37. The difference, if any, in the wattage produced by the two motors shows on dial 39. If there is any difference, this indicates greater friction loss in one wheel. Of course, for any difference to register on dial 39, clutch 16 must be disengaged so that the two pairs of rolls and the motor generators operate independently of each other.

To test the friction loss in the wheels, drive elements between the wheels and the engine, the drive wheels are on the rolls and the motor generators used as motors to rotate the wheels and drive elements. Friction loss is computed from extra wattage required by the motor generators to drive the wheels and drive elements.

Excess friction loss at one wheel or the other may be tested for by disengaging the clutch 16 and using first one motor and then the other. The friction loss in the drive elements will, of course, be the same regardless of which wheel is being driven so that any difference in wattage required by the two motor generators will indicate greater friction loss in one wheel.

A vehicle's brakes may be tested by rotating the wheels by means of the motor generators as above and applying the brakes. The wattage required by the motor generators to overcome the braking power provides the measurement of braking power. Total braking power registers on dial 37. During this test clutch 16 is disengaged and any difference between the braking power of the two wheels is indicated on dial 39 of the meter which measures the differential of wattage required by the two motors.

It will be appreciated that the apparatus of the present invention is also ideally suited for testing nonslip type differentials which are being used increasingly in new model vehicles. In this case, the vehicle's engine is used to drive the wheels. The clutch 16 is disengaged and the dynamometer used gradually to apply braking force to the wheel on the pair of rolls 10 and 11. The wheel on rolls 10a and 11a rolls comparatively freely as if on a patch of ice or in mud for example. By gradually increasing the braking force to the wheel on rolls 10 and 11 and watching the dynamometer dial 49 or the torque indicator with which such dynamometer until the wheel on rolls 10 and 11 is stopped i.e., the nonslip differential of the vehicle ceases to operate, it can be determined if the differential is properly adjusted.

The circuit for indicating the combined and differential power output or input of the motor generators is illustrated in FIG. 6. The motor generators 40 and 42 are preferably of the synchronous type either one speed or two speeds. It is characteristic of this type of motor generator to run only at a constant speed, or at two constant speeds one of which is a multiple of the other, related to the frequency of the current supply. A load on the motor generator results in current consumption and a drive torque applied cause the motor generator to generate current, but in either case the speed remains constant, until a load is reached at which the motor generator starts to "slip." The motor generators are here connected through a main switch 75 to a source of three phase current 76. Individual switches 77 and 78 are also provided for the motors.

To measure the combined power input or output of the motor generators, a three phase transformer 79 is connected in the circuit to both motors, and its secondaries 79a and 79b are connected to the actuating coils 37a and 37b of wattmeter 37. This meter registers the total power output or input of both motor generators 40 and 42, and preferably has its dial calibrated to read directly in horsepower. A second transformer 80 is connected in the circuit of motor generator 40 only, and has its secondaries 80a and 80b connected to the actuating coils 39a and 39b of wattmeter 39. A third transformer 81 is connected in the circuit of motor generator 42. This transformer has its secondaries 81a and 81b connected to coils 39a and 39b in such a manner that, when the input or output of the two motor generators is equal, the net current in the coils is zero. Any imbalance between the motor generator inputs or outputs will rotate the meter needle in one direction or the other. This wattmeter, also, is preferably calibrated to read in horsepower.

The motor generators with their associated indicating circuits may be used alone to make the various tests previously described. However, the power output of the vehicle engine is considerably greater than the power required to drive the vehicle wheels by means of the rolls for other tests such as the braking, power loss, and wheel alignment tests. It is advantageous to use the motor generators in combination with the absorption type of dynamometer 30, when measuring engine power output in the following manner.

With the vehicle engine running, the dynamometer 38 is set to apply enough braking torque to the rolls to hold them approximately at a speed corresponding to one of the synchronous speeds of the motor generators. The latter are then put into action, and the engine power output is determined by reading the power indicating dial 49, which is operated by the dynamometer and adding or subtracting the reading of wattmeter 37. If the dynamometer setting is lower than the actual power output of the engine the motor generators will supply the additional driving power necessary to hold the rolls at test speed, and will draw a proportionate current.

The combination of the dynamometer and motor generators for engine testing permits the use of motor generators of much smaller capacity than would otherwise be required, because the major part of the load is absorbed by the dynamometer. The combination also has many advantages as compared to using the dynamometer alone in engine output tests, because the motor generators automatically hold the rolls at a fixed speed. In using an absorption type of dynamometer alone, any fluctuation in engine output or change in the throttle setting causes a change in speed. The operator then has to reset the dynamometer to bring the system back to test speed. The inertia of the vehicle engine and drive system and the test system must be overcome when increasing or reducing the speed and causes a certain amount of overshooting or "hunting." It takes skillful manipulation and considerable time to stabilize the test equipment at the desired speed so that reliable readings can be obtained. With the combination, the operator does not have to reset the dynamometer, except when making major changes such as changing the throttle setting from half to full throttle or changing from one synchronous speed to another. When the speed is kept constant, the inertia of the system has no effect and power readings can be made immediately and accurately. Engine output tests can thus be run in a much shorter time and do not require as much skill on the part of the operator. The effect of adjustments made on the engine while running can also be immediately determined. For example, in adjusting the carburetor or timing the operator can readily determine when the optimum performance is reached by watching the change in output indicated by wattmeter 37.

To measure power output of each wheel individually a second dynamometer 38a (FIG. 1) may be connected to shaft 14a and the clutch 16 disengaged. The two dynamometers are set to the same braking torque, and the balance of the torque required to maintain synchronous speed is supplied to the rolls 11 and 11a individually by the motor generators. The differential power input is then indicated on meter 39.

It will be understood that the above description is of a preferred embodiment and that certain variations may be made in its structure without departing from the spirit of my invention.

I claim as my invention:

1. A vehicle and engine testing device, for testing vehicles having a pair of ground engaging drive members, comprising a first and a second means one engageable in driving relationship with each of said members, a first motor generator drivingly connected to said first means, a first absorption dynamometer connected to said first means and adapted to brake the same, a second motor generator drivingly connected to said second means, a second absorption dynamometer connected to said second means and adapted to brake the same, a first meter connected to measure the combined power used by and generated by said motor generators, and a second meter connected to simultaneously measure the differential of power used by and generated by said motor generators.

2. A testing device as described in claim 1, said motor generators being of the constant speed type.

3. A vehicle and engine testing device, for vehicles having a pair of ground engaging drive members, comprising a first and a second means one drivingly engageable with each of said members, a first motor generator drivingly connected to said first means, a second motor generator drivingly connected to said second means, a dynamometer connected to said second means and adapted to brake the same, a clutch interconnecting said first and second means and selectively engageable and disengageable to cause said means to be driven in unison and independently, means for measuring the combined power used by and generated by said motor generators, and means for simultaneously measuring the differential of power used by and generated by said motor generators.

4. Apparatus for testing wheels, engines, and drive elements of vehicles, comprising two pairs of rotatably mounted parallel rolls, each pair of rolls including a first roll and a second roll, said rolls in each pair being arranged to support a wheel with the axis of the wheel generally parallel to the axes of the rolls and with the periphery of the wheel in contact with the rolls, the two pairs of rolls being side by side so that one wheel of a pair of wheels is supported by one pair of rolls and the other wheel is supported on the other pair of rolls, two synchronous motor generators one being connected to each of said first rolls to drive said first rolls independently of one another, means for measuring the combined power input and, alternatively, output of said motor generators, and means for simultaneously measuring the differential between the power input and, alternatively, output of said motor generators.

5. Apparatus for testing wheels, engines, and drive elements of vehicles, comprising two pairs of rotatably mounted parallel rolls, each pair of rolls including a first roll and a second roll, said rolls in each pair being arranged to support a wheel with the axis of the wheel generally parallel to the axes of the rolls and with the periphery of the wheel in contact with the rolls, the two pairs of rolls being side by side so that one wheel of a pair of wheels is supported on one pair of rolls and the other wheel is supported on the other pair of rolls, two motor generators one being connected to each of said first rolls to drive said first rolls independently of one another, means for measuring the combined power input and, alternatively, output of said motor generators, and means for simultaneously measuring the differential between the power input and, alternatively, output of said motor generators.

6. Apparatus for testing wheels, engines, and drive elements of vehicles, comprising two pairs of rotatably mounted parallel rolls, each pair of rolls including a first roll and a second roll, said rolls in each pair being arranged to support a wheel with the axis of the wheel generally parallel to the axes of the rolls and with the periphery of the wheel in contact with the rolls, the two pairs of rolls being side by side so that one wheel of a pair of wheels is supported on one pair of rolls and the other wheel is supported on the other pair of rolls, clutch means for drivingly connecting said first rolls, two motor generators, one being drivingly connected to one of said first rolls and the other being drivingly connected to the other of said first rolls, meter means for measuring the wattage used by and generated by said motor generators, and other meter means for simultaneously measuring the differential between the wattage used by and, alternatively, generated by the motor generators.

7. Apparatus for testing wheels, engines, and drive elements of vehicles, comprising two pairs of rotatably mounted parallel rolls, each pair of rolls including a first roll and a second roll mounted so as to be movable laterally along its axis, said rolls in each pair being arranged to support a wheel with the axis of the wheel generally parallel to the axes of the rolls and with the periphery of the wheel in contact with the rolls, the two pairs of rolls being side by side so that one wheel of a pair of wheels is supported on one pair of rolls and the other wheel is supported on the other pair of rolls, clutch means for drivingly connecting said first rolls, two motor generators, one being drivingly connected to one of said first rolls and the other being drivingly connected to the other of said first rolls, means for measuring lateral pressure applied to said laterally movable second rolls thereby to measure lateral pressure exerted on the second rolls by wheels supported thereon, the axes of which wheels are out of parallel with the axes of the respective rolls with which the wheels are in contact, a dynamometer operably connected to one of said first rolls, meter means for measuring the wattage used by and generated by said motor generators, and other meter means for measuring the differential between the wattage used by and, alternatively, generated by the motor generators.

References Cited by the Examiner
UNITED STATES PATENTS

| | | | |
|---|---|---|---|
| 1,875,742 | 9/1932 | Langbein | 73—125 |
| 2,130,833 | 9/1938 | Bennett | 73—123 X |
| 2,130,900 | 9/1938 | Presbrey | 73—117 |
| 2,270,230 | 1/1942 | Pearce | 33—203.13 |
| 3,020,753 | 2/1962 | Maxwell | 73—117 |

RICHARD C. QUEISSER, *Primary Examiner.*

J. W. MYRACLE, *Assistant Examiner.*